Patented Jan. 2, 1923.

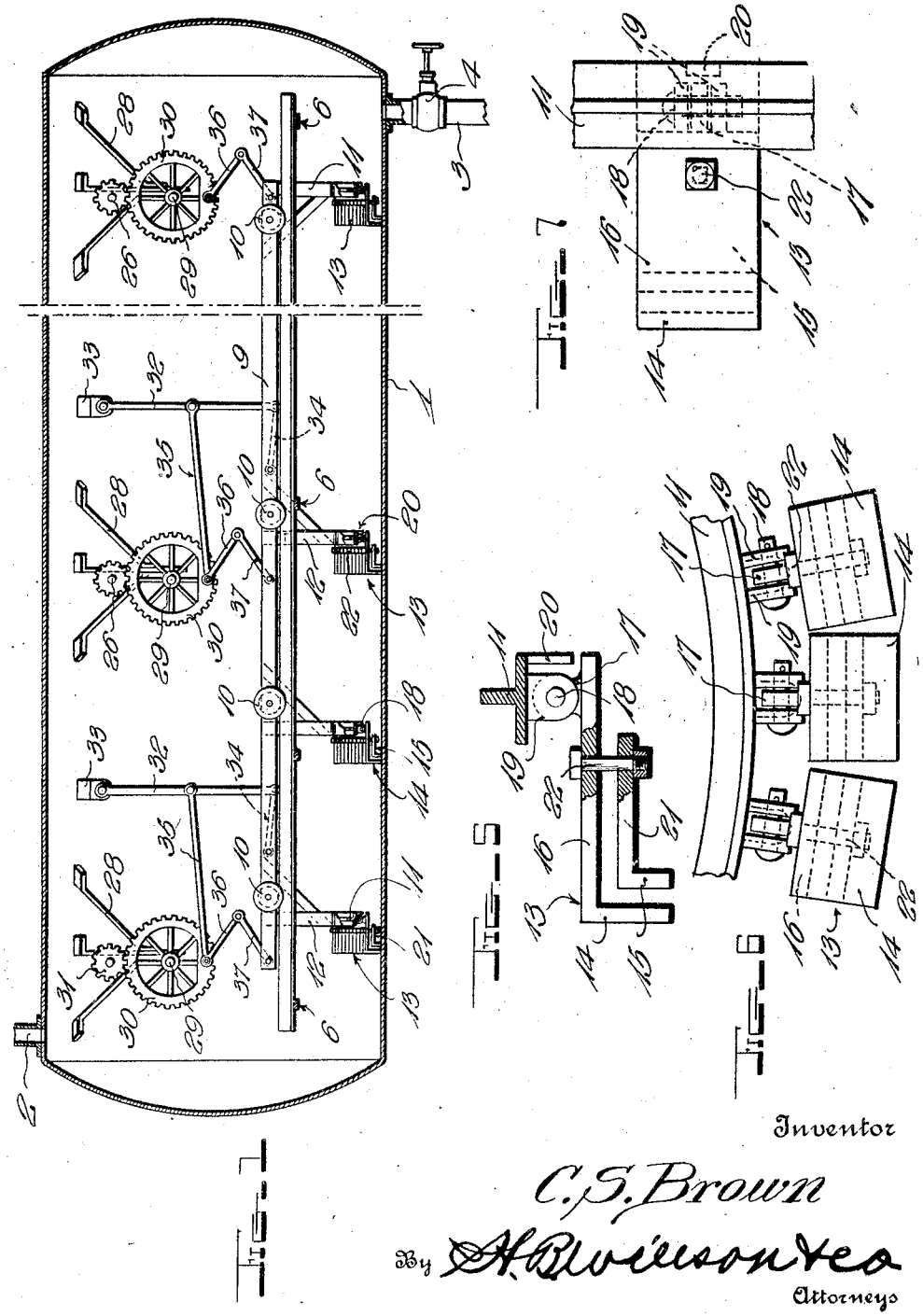

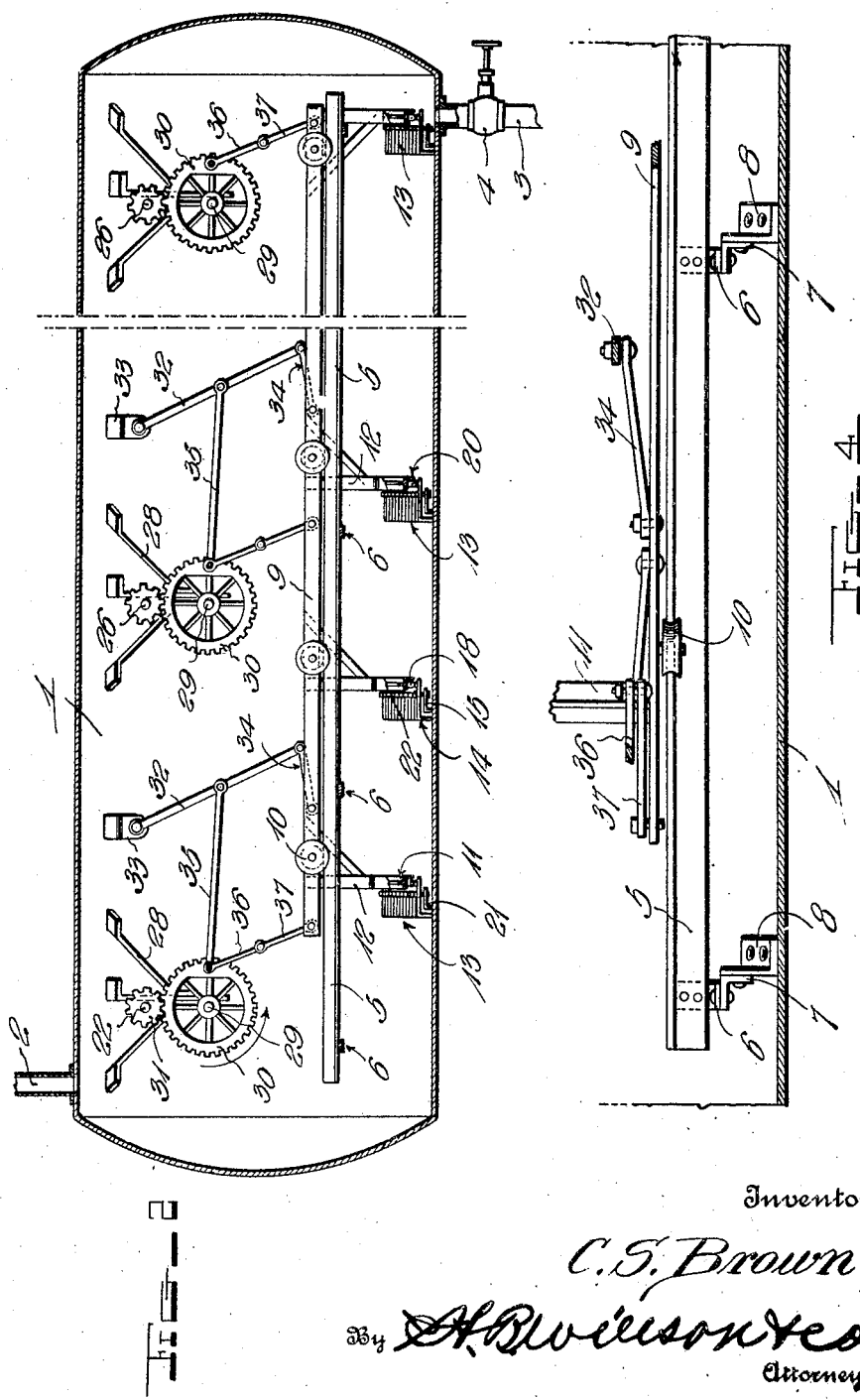

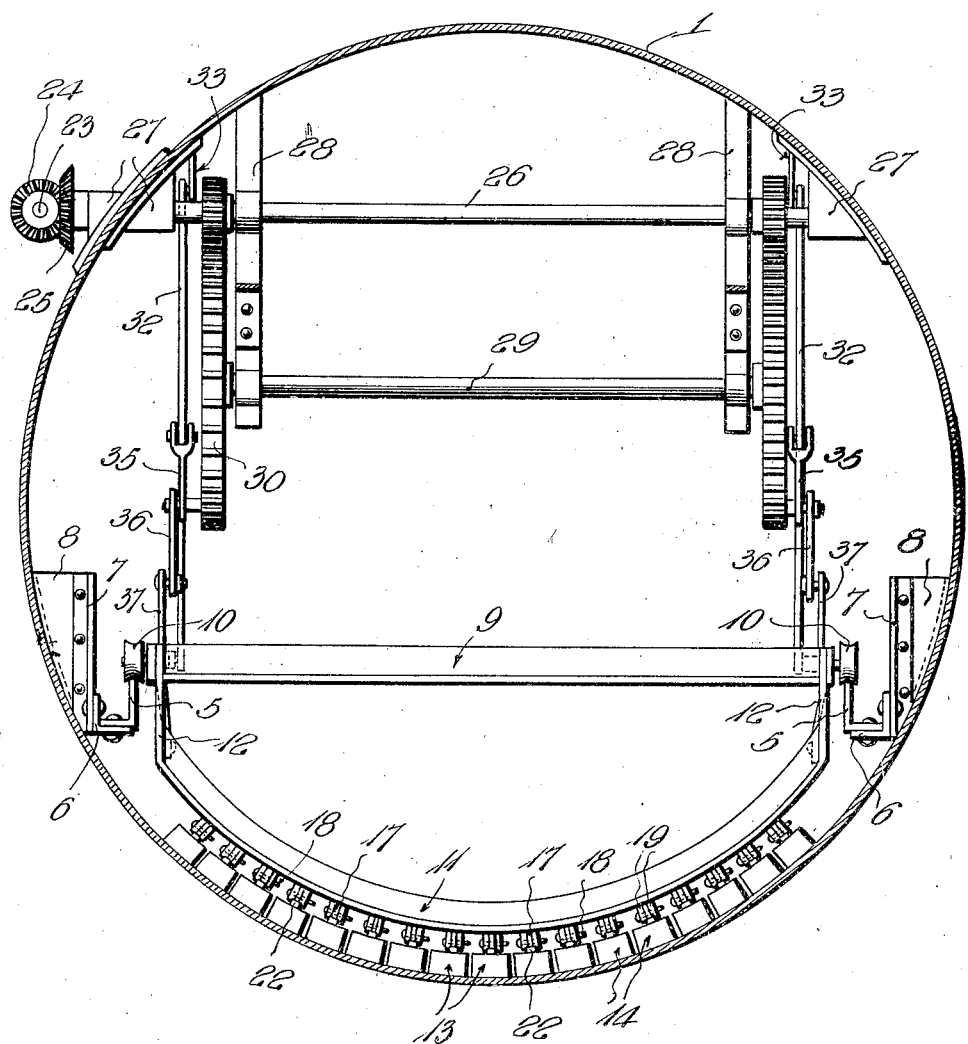

1,441,058

UNITED STATES PATENT OFFICE.

CHARLES S. BROWN, OF PONCA CITY, OKLAHOMA.

DISTILLING-VAT SCRAPER.

Application filed July 15, 1920. Serial No. 396,473.

*To all whom it may concern:*

Be it known that I, CHARLES S. BROWN, a citizen of the United States, residing at Ponca City, in the county of Kay and State of Oklahoma, have invented certain new and useful Improvements in Distilling-Vat Scrapers; and I do declare the following to be a full, clear, and exact description of the invention, such as will enable others skilled in the art to which it appertains to make and use the same.

This invention relates to an improved distilling vat scraper and one object of the invention is to provide a scraping mechanism which may be mounted in a distilling vat and in which the scrapers will have movement longitudinally of the vat with the scraping blades engaging the vat as they move in a scraping direction and will then be swung upwardly and held out of engagement with the walls of the vat as they are moved longitudinally of the vat upon the return movement.

Another object of the invention is to provide an operating mechanism for the scraping structure which will be so constructed that the frame which carries the scraping blades may have sliding movement upon a track when the scraping blades are moving in the power stroke and then may be swung upwardly out of engagement with the tracks and carried through the vat and replaced upon the tracks during the return stroke.

Another object of the invention is to provide an improved type of scraping blade which consists of a main scraping blade pivotally mounted and an auxiliary scraping blade connected with the main scraping blades.

Another object of the invention is to so construct this improved scraping device that the driven shaft which transmits rotary movement to the operating gears may be all rotated from a single driving shaft extending longitudinally of the vat and outside of the same.

This invention is illustrated in the accompanying drawings, wherein:—

Figure 1 is a longitudinal sectional view through a vat having the improved scraping mechanism mounted therein and shown in side elevation, Figure 2 is a view similar to Fig. 1 showing the scraping mechanism about to leave the tracks of the vat for the return stroke, Figure 3 is an enlarged transverse sectional view through the vat with the scraping mechanism shown in end elevation, Figure 4 is a fragmentary longitudinal sectional view through the vat and scraping mechanism, Figure 5 is a fragmentary view showing one of the improved scrapers in elevation and the carrying bar for the same in section, Figure 6 is a fragmentary view showing a number of the scraping blades in elevation as shown in Fig. 3, and Figure 7 is a top plan view of the structure shown in Fig. 5.

This device is used for scraping sediment and other matter which collects in the bottom portion of a vat 1 which is used in distilling oil, the oil being fed into the vat through the inlet 2 and withdrawn through this same inlet or through any other suitable outlet and the sediment being removed from the vat through the outlet 3 which is positioned adjacent the end of the vat from the inlet 2 and is provided with a valve 4 which controls the passage of material through the outlet.

In order to mount the scraper frame for movement longitudinally in the vat, there has been provided tracks 5 which are formed of angle iron and are carried by brackets 6 secured to strips or hanger bars 7 which in their turn are mounted upon bracket strips 8 riveted or otherwise securely connected with the walls of the vat. It will thus be seen that the scraper frame 9 will be supported parallel to the bottom of the vat and will be slidably mounted when its rollers 10 are in engagement with the tracks or rails 5. This scraper frame carries yokes 11 which are curved longitudinally as shown in Fig. 3 and are provided with side arms 12 extending upwardly and connected with the side bars of the scraper frame 9. The yokes will, therefore, conform to the transverse contour of the lower portion of this vat and the scraping blades which are connected therewith will have proper engagement with the vat.

These scraping blades which are designated in general by the numeral 13 will each be provided with a main blade 14 and an auxiliary blade 15, the main blade having an elongated shank 16 which carries a hinge ear 17 adjacent its end as shown in Fig. 5 so that the main blade may be pivotally mounted by means of a pivot pin 18 which passes through the ear 17 and ear 19 of the yokes 11. In order to prevent this scraping blade from swinging downwardly beyond a desired amount, an abutment 20 has been provided which will engage the shank in the rear of the ear 17. The auxiliary scraping blade 15 is positioned beneath the main scraping blade and has its shank 21 extending rearwardly and provided with an opening which will be positioned in alinement with an opening of the main blade thus permitting the bolt 22 to be passed through the alined openings of the two blades and suspend the auxiliary blade beneath the main blade. It will thus be seen that when the scraping blades are in place, they will be mounted as shown clearly in Figures 3, 5, 6 and 7 and will engage the walls of the vat to scrap the sediment from the same. From an inspection of Fig. 6, it will be noted that the blades terminate slightly in spaced relation which would tend to leave unscrapped portions of the vat but this is prevented due to the fact that the blades of each set will be positioned in staggered relation to the blades of adjacent sets and therefore the entire surface of the vat walls will be scraped and all sediment removed.

In order to impart movement to the scraper carrying frame, there has been provided a main driving shaft 23 which extends longitudinally of the vat and outside of the frame and is provided with a plurality of gears 24 which mesh with gears 25 mounted upon the outer ends of shafts 26. These shafts 26 extend transversely of the vat and are rotatably mounted in bearings 27 and are further supported by hanger brackets 28, the hanger bearing brackets 28 being extended downwardly below the shafts 26 and rotatably supporting shafts 29. These shafts 29 carry gears 30 which are relatively large gears and mesh with gears 31 mounted upon the shafts 26 and it will thus be seen that when the shafts 26 are rotated by the main driving shaft 23, the shafts 29 will also be rotated. Rocker arms 32 are pivotally mounted by means of brackets 33 and extend downwardly and have their lower ends loosely connected with links 34 which are connected with the side bars of the scraper frame 9. Pitman rods 35 are loosely connected with gears 30 and connected with the rocker arms 32 for imparting swinging movement to the rocker arms as the gears 30 rotate and links 36 and 37 are pivotally connected and extend upwardly and downwardly with the links 36 connected with the gears 30 and the links 37 loosely connected with the scraper frame. Therefore, when the main driving shaft 23 is rotating the gears 30 will be rotated and as these gears rotate, the hanger bars 32 will swing upon their pivots in the arc of a circle. As the arms or levers 32 swing from the position shown in Fig. 1 to that shown in Fig. 2, they will draw upon the frame 9 through the medium of the links 34 and this frame will draw longitudinally of the vat with the scrapers engaging the walls of the vat and scraping sediment towards the end of the vat having the outlet pipe 3 communicating therewith. The links 36 and 37 will move from the position shown in Fig. 1 to that of Fig. 2, as the gears 30 rotate and upon a continued rotation of the gears, the links 36 and 37 will be drawn apart and carried upwardly thus lifting the frame 9 off of the tracks or rails 5. The scraper frame will thus be lifted to move the scraping blades out of engagement with the walls of the vat and will be carried forwardly and then lowered into engagement with the tracks and moved longitudinally of the vat for a second scraping movement. It should be noted that each set of scrapers in moving rearwardly during the power stroke covers a length of that which is greater than the distance between the sets of scrapers and, therefore, when the scraping frame is returned into engagement with the tracks and the blades engage the bottom of the vat, they will rest upon a section of the bottom which has been previously scraped. Therefore, the sediment will be very thoroughly removed from the vat.

What is claimed is:

1. A vat having a sediment outlet, a scraper frame mounted for movement longitudinally of the vat, yokes connected with the scraper frame, hinge ears carried by the yokes, and scraping elements each having a main scraping blade provided with a vertically disposed head and a horizontal shank extending rearwardly and pivotally connected with the hinge ears, and an auxiliary blade positioned beneath each of the main blades and having a vertical head positioned to the rear of the head of the first blade and a shank extending rearwardly and positioned beneath and supported from the shank of the main blade, and actuating means for imparting movement to the scraper frame.

2. A vat scraping device comprising a frame, means for movably mounting said frame, yokes forming parts of said frame, scraping elements each having a main scraping blade provided with a shank extension connected with said yokes, and an auxiliary scraping blade positioned beneath and to the rear of the main scraping blade and having a shank extension positioned beneath and suspended from the shank of the main blade, and operating means for imparting movement to said frame.

3. A scraper structure for the purpose set forth including scraper carrying means, and scraper means including a main scraper blade having a shank extending from the same and pivotally connected with the carrier, and an auxiliary scraper blade positioned to the rear of the main scraper blade and having a shank extension extending beneath the shank of the main blade, the shanks of the main and auxiliary blades being provided with openings, and a bolt passing through the openings of the shanks to suspend the auxiliary blade from the shank of the main blade.

4. A scraper structure for the purpose set forth including scraper carrying means, and scraper means including a main scraper blade having a shank extension connected with the carrier, and an auxiliary scraper blade positioned to the rear of the main scraper blade and having a shank extension extending beneath and suspended from the shank of the main blade.

In testimony whereof I have hereunto set my hand in the presence of two subscribing witnesses.

CHARLES S. BROWN.

Witnesses:
 EARL D. BARTLETT,
 E. C. ALEXANDER.